May 10, 1955
M. A. LERMAN
2,707,886
HAND CONTROLS FOR AUTOMOBILES
Filed July 26, 1951
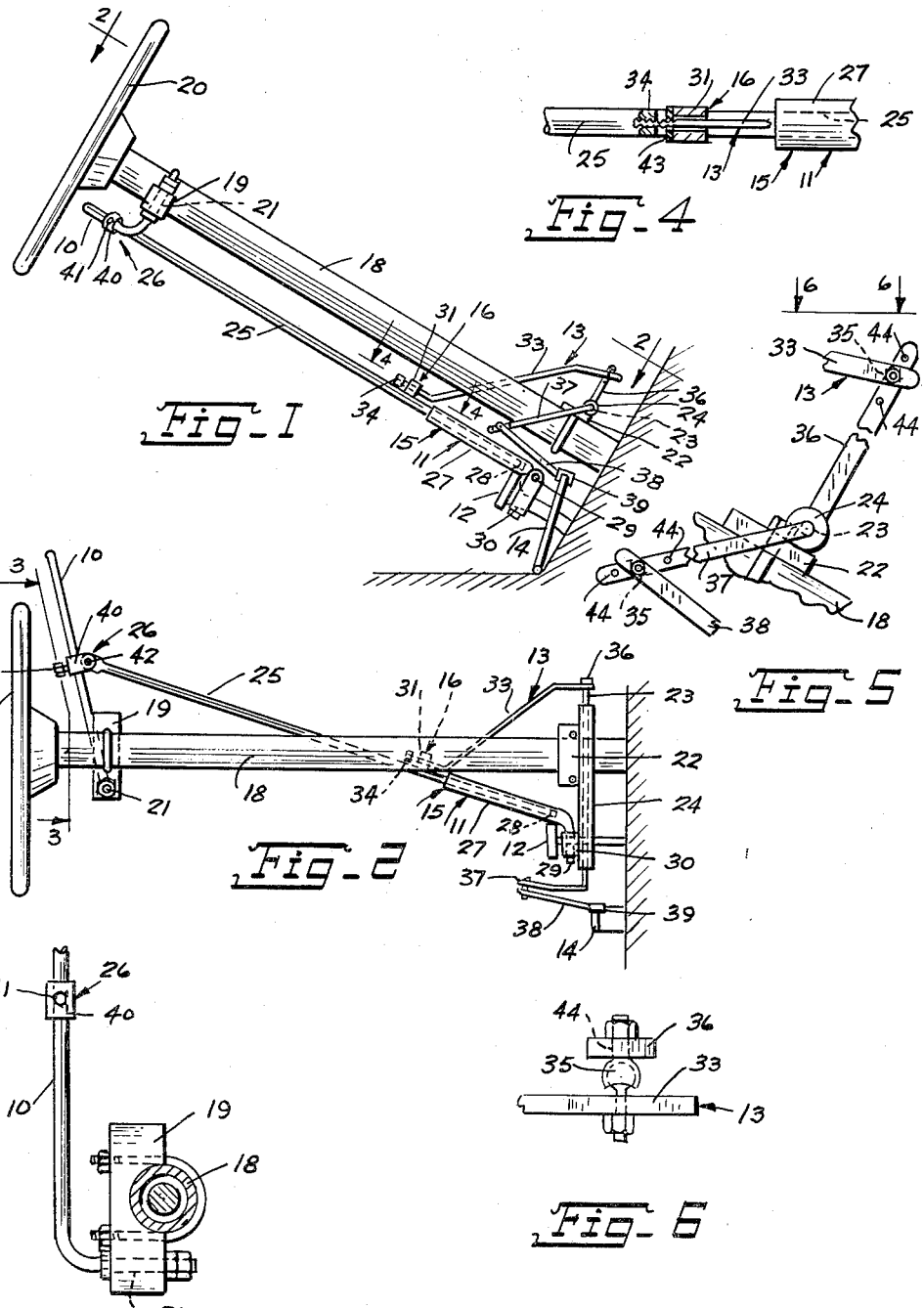
INVENTOR
MONROE ARNOLD LERMAN
BY
ATTORNEY

United States Patent Office 2,707,886
Patented May 10, 1955

2,707,886

HAND CONTROLS FOR AUTOMOBILES

Monroe Arnold Lerman, Sunnyside, N. Y.

Application July 26, 1951, Serial No. 238,660

4 Claims. (Cl. 74—481)

This invention relates to new and useful improvements in hand controls for the brakes and throttles of automobiles.

Heretofore a separate hand control has been provided for the brake, throttle and shift of automobiles intended to be driven by persons incapable of using their legs for driving. The disadvantage of using separate hand controls resides in the fact that the driver is compelled to move his hand or hands from one control to another during the driving operation. With some arrangements, when the hand controls are situated on opposite sides of the steering wheel there is a tendency for the operator to release the steering wheel completely while operating the controls. Some times the operation of the separate controls partially overlap each other. These deficiencies place an undue handicap on the driver.

The dominating object of this invention resides in the construction of a hand control for the brake and throttle of an automobile which is operated with but one hand lever. With this arrangement the brake and the throttle may be operated without releasing the hand lever. It is proposed that the hand lever be moved in one direction for operating the brake, and in another direction for operating the throttle. It is proposed that these directions be opposite to each other so that automatically the brake is released when the throttle is depressed, and vice versa, the throttle is released when the brake is depressed.

Another important object of this invention resides in providing two linkage systems connected with and operated by the single hand lever and respectively connected with the brake and throttle for selectively operating the brake and throttle as desired. With this construction these linkage systems have certain links in common with each other, including the hand lever for operating each of the linkage systems. It is further proposed to so arrange these linkage systems that they operate in opposite directions so that the hand lever may be moved in one direction for depressing the brake, and in another direction for depressing the throttle while releasing the brake.

Another and very important object of this invention resides in providing each of the linkage systems with a slip connector operating in opposite directions to each other so that one linkage system will idle when the other is operating, and the latter linkage system will idle when the first named linkage system is operated. With this arrangement the hand lever may be moved in one direction to depress the brake through one of the slip connectors, while the other slip connector idles, and said hand lever may be moved in the other direction to depress the throttle through the other of said slip connectors while said first mentioned slip connector idles. An advantage gained by using the slip connectors resides in the fact that they permit the linkage systems to be permanently connected, if desired, to the brake pedal and throttle of the automobile.

Still further the invention proposes the construction of a hand control for the brake and throttle of an automobile which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a schematic side elevational view of the steering post, brake pedal and foot throttle of an automobile equipped with a hand control for operating said brake and throttle in accordance with this invention.

Fig. 2 is an elevational view looking in the direction of the line 2—2 of Fig. 1.

Fig. 3 is an enlarged sectional view taken on the line 3—3 of Fig. 2.

Fig. 4 is a fragmentary enlarged sectional view taken on the line 4—4 of Fig. 1.

Fig. 5 is a fragmentary enlarged detailed view of a portion of Fig. 1.

Fig. 6 is a fragmentary plan view looking in the direction of the line 6—6 of Fig. 5.

The hand control for a brake and throttle of an automobile as disclosed on the drawing, includes a hand lever 10 movably mounted to move forwards and rearwards. A linkage system 11 connects the hand lever 10 and the brake pedal 12 in a manner so that the brake pedal 12 may be depressed when the hand lever 10 is moved in one direction. Another linkage system 13 connects the hand lever 10 and the throttle 14 in a manner so that the throttle 14 may be depressed when the hand lever 10 is moved in the other direction. These linkage systems 11 and 13 have certain links in common with each other, as will appear as this specification proceeds.

A slip connector 15 is connected in the linkage system 11. Another slip connector 16 is connected in the linkage system 13. These slip connectors 15 and 16 operate in opposite directions to each other in order that said hand lever 10 may be moved in one direction to depress said brake 12 through one of said connectors, namely, the connector 15, while the connector 16 idles, and said hand lever 10 may be moved in the other direction to depress said throttle 14 through said connector 16 while the connector 15 idles. The hand lever 10 and linkage systems 11 and 13 are mounted on the steering post 18. More particularly, a clamp 19 is mounted on the steering post 18 at a point beneath the steering wheel 20. The hand lever 10 is pivotally mounted on the clamp 19 by having one of its ends 21 bent at right angles and engaging through said clamp 19. The linkage system 13 is also mounted on the steering post 18 by being mounted upon a clamp 22 mounted on the steering post 18 near the bottom of the post 18. The linkage system 13 includes a rod 23 which is turnably mounted through a bearing tube 24 attached on the clamp 22.

The linkage system 11 includes the hand lever 10 and a rod 25 which is connected with the hand lever 10 by a joint 26 or other flexible connection. This rod 25 connects with the slip connector 15 which merely comprises a cylinder 27 into which the rod 25 slidably engages. The inner end of the rod 25 engages a rubber cushion disc 28 resting in the bottom of the cylinder 27. The cylinder 27 has a reduced end 29 pivotally connected with a clamp 30 which is rigidly attached to the brake pedal 12. The slip connector 16 comprises merely an eye member 31 rigidly mounted on the rod 25. The linkage system 13 includes said hand lever 10, said rod 25 and furthermore includes a rod 33 which slidably engages through said eye member 31. Said rod 33 has a nut 34 adjustably mounted on its end which passes through said eye member 31.

It should be noted that motion of the rod 25 in one direction engages the eye member 31 against the nut 34 to pull the rod 33, while motion of the rod 25 in the other direction merely slides the eye member 31 on the rod 33. The rod 33 is pivotally connected at its other end by a ball joint connection 35 with an arm 36 mounted on and extending upwards of the rod 23. A downwardly extending arm 37 is mounted on the other end of said rod 23. Said arm 37 is connected by a ball joint connection 35 with a rod 38 rigidly mounted on a clamp 39 mounted on said throttle 14. The joint 26 comprises a collar 40 slidably mounted on said lever 10 and held in adjusted positions by a clamp screw 41, and a pintle 42 pivotally connecting said collar 40 and rod 25. A rubber washer 43 is mounted beneath the nut 34, see Fig. 4. The arms 36 and 37 have several openings 44 to accommodate the ball joint connections 35 in order that the rods 33 and 38 may be connected at several selected positions to control the amount which the throttle 14 is depressed when operated.

The operation of the device may be understood from the following:

The operator of the vehicle may move the lever 10 forwards to move the rod 25 forwards so as to depress the brake pedal 12 through the slip connector 15 by the inner end of the rod 25 engaging the remote end of the cylinder 27. During this forward motion of the hand lever 10, the rod 25 moves forwards and the eye member 31 merely idles in a forwardly direction along the rod 33 so that the linkage system 13 which operates the throttle 14 is not affected.

The operator of the automobile may move the hand lever 10 backwards so that the eye member 31 engages the nut 34 of the rod 33 and moves the rod 33 for operating the linkage system 13 to depress the throttle 14 through arm 36 by the rod 33 pivoting the rod 23 which depresses the throttle 14 through arm 37 and rod 38. During the operation of the throttle 14 the brake 12 is released and not operated because rearward motion of the lever 10 moves the rod 25 rearwards so that the inner end of rod 25 disengages from the remote end of the cylinder 27 and then merely idles within the cylinder 27. It should be particularly noted that the hand brake 12 and throttle 14 are operated by the one hand lever 10. It should also be noted that it is impossible to depress the hand brake 12 and throttle 14 simultaneously by operating the hand lever 10.

The clamp 19 may be removed from the steering post 18 and turned around so that the hand lever 10 is directed towards the right so that it may be operated by the right hand if this is required or desired. This change will require slight changes and adjustments in the linkage systems 11 and 13 for the control to operate in substantially the same way.

While I have illustrated and described the preferred embodiment of my invention, it is to be understood that I do not limit myself to the precise construction herein disclosed and the right is reserved to all changes coming within the scope of the invention as defined in the appended claims.

Having thus described my invention, what I claim as new and desire to secure by United States Letters Patent is:

1. A hand control for the brake and throttle pedals of a motor vehicle having a steering column and a steering wheel supported at the top of said column, said hand control comprising a clamp which is adjustably secured to said steering column below said steering wheel, a hand lever pivotally secured at one end to said clamp, the pivotal movement of the opposite end of said hand lever being toward and away from the brake pedal, a second clamp adjustably secured to said hand lever intermediate its ends, said second clamp being adjustable toward and away from either of the ends of said hand lever, a thrust rod pivotally secured at one end to said second clamp, a sleeve slidably mounted on the opposite end of said thrust rod for axial movement relative thereto, said sleeve and said thrust rod being coaxial with each other, a bottom wall formed at the lower end of said sleeve, a third clamp adjustably secured to said brake pedal, a pivotal connection between the lower end of said sleeve and said third clamp, whereby depressing said opposite end of the hand lever causes the thrust rod to move downwardly in and relative to the sleeve until the lower end of said thrust rod abuts the bottom wall of said sleeve, further movement of said hand lever and thrust rod in the same direction causing the thrust rod to push the sleeve downwardly, together with its pivotal connection with the third clamp as well as said third clamp to depress the brake pedal, thereby actuating the brakes of the motor vehicle, an eye member mounted on said thrust rod above said sleeve, a pull rod slidably mounted in said eye member, a stop member adjustably secured to the upper end of said pull rod, a fourth clamp adjustably secured to the lower end of the steering column adjacent the throttle pedal, a bell-crank pivotally mounted on said fourth clamp, one end of said bell-crank being pivotally connected to the lower end of said pull rod, a link clamped at one end to the throttle pedal, the opposite end of said link being pivotally secured to the opposite end of said bell-crank, whereby said opposite end of the hand lever may be pulled toward the steering wheel to pull upwardly upon the thrust rod until the eye member thereon engages the stop member on the pull rod, further upward movement of said opposite end of the hand lever causing the thrust rod through its eye member to pull upwardly upon the pull rod, thereby actuating the bell-crank and the link to depress the throttle pedal in order to actuate the throttle of the motor vehicle.

2. A hand control in accordance with claim 1, wherein the first end of the bell-crank is adjustably secured to the lower end of the pull rod and the opposite end of the bell-crank is adjustably secured to the link.

3. A hand control in accordance with claim 1, in which the pull rod is bent in opposite directions at two spaced points intermediate its upper and lower ends, thereby providing upper and lower portions which are laterally offset from each other to enable the upper portion to engage through the eye member and the lower portion to engage the first end of the bell-crank, said eye member and said first end of the bell-crank being situated in spaced relation to each other both longitudinally and transversely of the steering column.

4. A hand control in accordance with claim 1, wherein the lower end of the sleeve is bent laterally to form the bottom wall against which the lower end of the thrust rod is adapted to engage, said bent lower end of the sleeve serving also as the pivot in the pivotal connection between said sleeve and the third clamp.

References Cited in the file of this patent

UNITED STATES PATENTS

| | | |
|---|---|---|
| 1,293,468 | Kettering | Feb. 4, 1919 |
| 1,403,390 | Cameron | Jan. 10, 1922 |
| 1,548,725 | Manwaring | Aug. 4, 1925 |
| 1,551,696 | Reynolds | Sept. 1, 1925 |
| 2,523,491 | Auten | Sept. 26, 1950 |
| 2,548,240 | Reeder | Apr. 10, 1951 |
| 2,602,348 | Wilson | July 8, 1952 |